US009560656B2

(12) United States Patent
Damnjanovic et al.

(10) Patent No.: US 9,560,656 B2
(45) Date of Patent: Jan. 31, 2017

(54) JOINT SUPPORT FOR UES CAPABLE OF COMMUNICATING DATA OF A SAME BEARER ON FIRST AND SECOND RATS SIMULTANEOUSLY AND UES NOT CAPABLE OF COMMUNICATING DATA OF A SAME BEARER ON THE FIRST AND SECOND RATS SIMUTANEOUSLY

(71) Applicant: QUALCOMM Incorporated, San Diego, CA (US)

(72) Inventors: Jelena Damnjanovic, Del Mar, CA (US); Ozcan Ozturk, San Diego, CA (US); Vikas Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 14/514,123

(22) Filed: Oct. 14, 2014

(65) Prior Publication Data
US 2015/0110048 A1 Apr. 23, 2015

Related U.S. Application Data

(60) Provisional application No. 61/892,287, filed on Oct. 17, 2013.

(51) Int. Cl.
*H04W 72/04* (2009.01)
*H04W 76/02* (2009.01)
(Continued)

(52) U.S. Cl.
CPC ......... *H04W 72/048* (2013.01); *H04W 76/026* (2013.01); *H04W 28/08* (2013.01); *H04W 72/1215* (2013.01); *H04W 88/06* (2013.01)

(58) Field of Classification Search
CPC .. H04W 28/10; H04W 72/1215; H04L 47/125
See application file for complete search history.

(56) References Cited

U.S. PATENT DOCUMENTS

2009/0156135 A1* 6/2009 Kamizuma .......... H04B 1/0082
455/73
2011/0044218 A1 2/2011 Kaur et al.
(Continued)

FOREIGN PATENT DOCUMENTS

EP 2704481 A1 3/2014
WO WO-2012163260 A1 12/2012
(Continued)

OTHER PUBLICATIONS

International Search Report and Written Opinion—PCT/US2014/060659—ISA/EPO—Jul. 23, 2015.

*Primary Examiner* — Alvin Zhu
(74) *Attorney, Agent, or Firm* — Patterson & Sheridan LLP

(57) ABSTRACT

Aspects of the present disclosure relate to joint support for UEs capable of communicating data of a same bearer on first and second RATs simultaneously and UEs not capable of communicating data of a same bearer on the first and second RATs simultaneously. An eNB of a first RAT may configure radio bearers of different types for communication with a UE scapable of communicating via a first RAT and a second RAT. The eNB may select one or more of the radio bearers for routing packets to the UE via at least one of the first or second RAT, wherein the selecting is based at least in part on whether the UE is capable of communicating data of a same bearer on the first and second RATs simultaneously. The eNB may communicate with the UE using the selected radio bearers.

20 Claims, 12 Drawing Sheets

(51) Int. Cl.
    *H04W 88/06*     (2009.01)
    *H04W 28/08*     (2009.01)
    *H04W 72/12*     (2009.01)

(56) References Cited

U.S. PATENT DOCUMENTS

| | | | |
|---|---|---|---|
| 2012/0172031 A1* | 7/2012 | Marocchi | H04W 4/06 455/422.1 |
| 2013/0016696 A1 | 1/2013 | Adjakple et al. | |
| 2013/0088983 A1 | 4/2013 | Pragada et al. | |
| 2014/0079007 A1* | 3/2014 | Li | H04W 28/10 370/329 |

FOREIGN PATENT DOCUMENTS

| | | |
|---|---|---|
| WO | WO-2014060543 A1 | 4/2014 |
| WO | WO-2014060544 A1 | 4/2014 |
| WO | WO-2014129811 A1 | 8/2014 |

* cited by examiner

JOINT SUPPORT FOR UES CAPABLE OF COMMUNICATING DATA OF A SAME BEARER ON FIRST AND SECOND RATS SIMULTANEOUSLY AND UES NOT CAPABLE OF COMMUNICATING DATA OF A SAME BEARER ON THE FIRST AND SECOND RATS SIMUTANEOUSLY

CROSS-REFERENCE TO RELATED APPLICATION

This application claims of priority to U.S. Application Ser. No. 61/892,287, filed Oct. 17, 2013, which is expressly incorporated herein by reference in its entirety.

BACKGROUND

Field of the Disclosure

Aspects of the present disclosure generally relate to wireless communications and more particularly, to architecture for joint support by an eNB for UEs capable of communicating data of a same bearer on first and second radio access technologies (RATs) simultaneously (e.g., UEs capable of RLC and/or PDCP aggregation) and UEs not capable of communicating data of a same bearer on the first and second RATs simultaneously (e.g., UEs capable of bearer selection only).

Description of Related Art

Wireless communication networks are widely deployed to provide various communication services such as voice, video, packet data, messaging, and broadcast services. These wireless communication networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

As wireless communication technology advances, a growing number of different radio access technologies are being utilized. For instance, many geographic areas are now served by multiple wireless communication systems, each of which can utilize one or more different radio access technologies (RATs). In order to increase versatility of UEs in such systems, there recently has been an increasing trend toward multi-mode UEs that are able to operate in networks using different types of RATs. For example, a multi-mode UE may be able to operate in both wireless wide area networks (WWANs) and wireless local area networks (WLANs, for example, a WiFi network). A WWAN may be, for example, a cellular network (e.g., a 3G and/or 4G network).

SUMMARY

Certain aspects of the present disclosure provide a method for wireless communication by an evolved Node B (eNB) for a first radio access technology (RAT). The method generally includes configuring radio bearers of different types for communication with a UE capable of communicating via the first RAT and a second RAT, selecting one or more of the radio bearers for routing packets to the UE via at least one of the first or second RAT, wherein the selecting is based at least in part on whether the UE is capable of communicating data of a same bearer on the first and second RATs simultaneously, and communicating with the UE using the selected radio bearers.

Certain aspects of the present disclosure provide an apparatus for wireless communication by an evolved Node B (eNB) of a first radio access technology (RAT). The apparatus generally includes means for configuring radio bearers of different types for communication with a UE capable of communicating via the first RAT and a second RAT, means for selecting one or more of the radio bearers for routing packets to the UE via at least one of the first or second RAT, wherein the means for selecting is based at least in part on whether the UE is capable of communicating data of a same bearer on the first and second RATs simultaneously, and means for communicating with the UE using the selected radio bearers.

Certain aspects of the present disclosure provide an apparatus for wireless communication by an evolved Node B (eNB) of a first radio access technology (RAT). The apparatus generally includes at least one processor and a transmitter. The at least one processor is generally configured to configure radio bearers of different types for communication with a UE capable of communicating via the first RAT and a second RAT, select one or more of the radio bearers for routing packets to the UE via at least one of the first or second RAT, wherein the selecting is based at least in part on whether the UE is capable of communicating data of a same bearer on the first and second RATs simultaneously. The at least one transmitter is generally configured to communicate with the UE using the selected radio bearers.

Certain aspects of the present disclosure provide a computer readable medium for wireless communications having instructions stored thereon. The instructions are executable by one or more processors, for configuring, by an evolved Node B (eNB), radio bearers of different types for communication with a UE capable of communicating via a first radio access technology (RAT) and a second RAT, selecting, by the eNB, one or more of the radio bearers for routing packets to the UE via at least one of the first or second RAT, wherein the selecting is based at least in part on whether the UE is capable of communicating data of a same bearer on the first and second RATs simultaneously, and communicating, by the eNB, with the UE using the selected radio bearers.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure generally relate to joint support by an eNB for at least two types of UEs, those UEs capable of communicating data of a same bearer on a first and a second RAT simultaneously and those UEs not capable of such communication. As will be described in more detail herein, UEs capable of communicating data of a same bearer on first and second RATs simultaneously are referred to as UEs capable of RLC aggregation and/or PDCP aggregation. UEs not capable of communicating data of a same bearer on first and second RATs simultaneously are referred to as UEs capable of bearer selection only.

Figure 8:
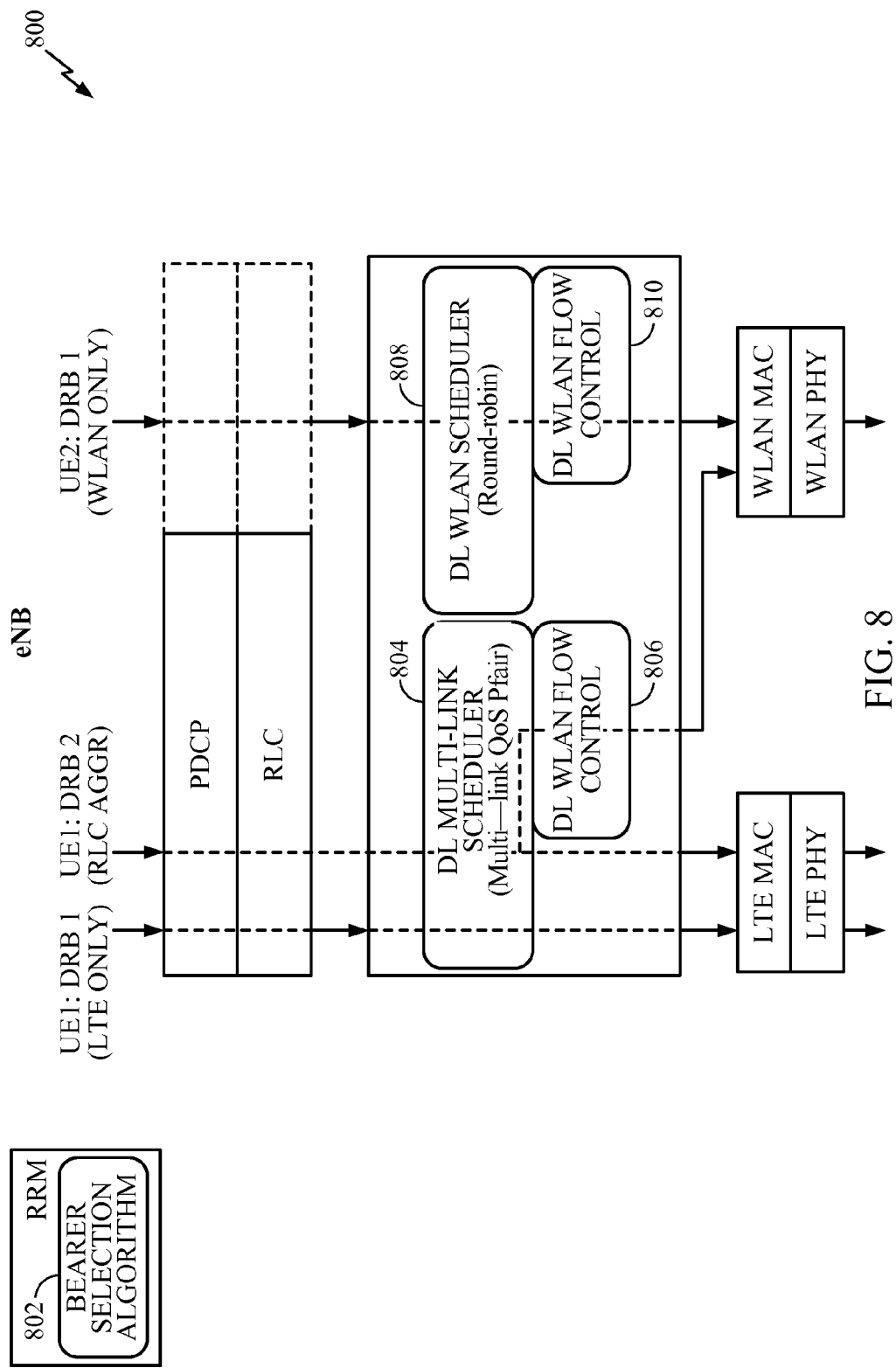
FIG. 8 illustrates an example data flow for joint support of UEs capable of communicating data of a same bearer on the first and second RATs simultaneously and UEs not capable of communicating data of a same bearer on the first and second RATs simultaneously using separate schedules and flow control modules for each type of UE at the eNB, in accordance with certain aspects of the present disclosure.
Figure 9:
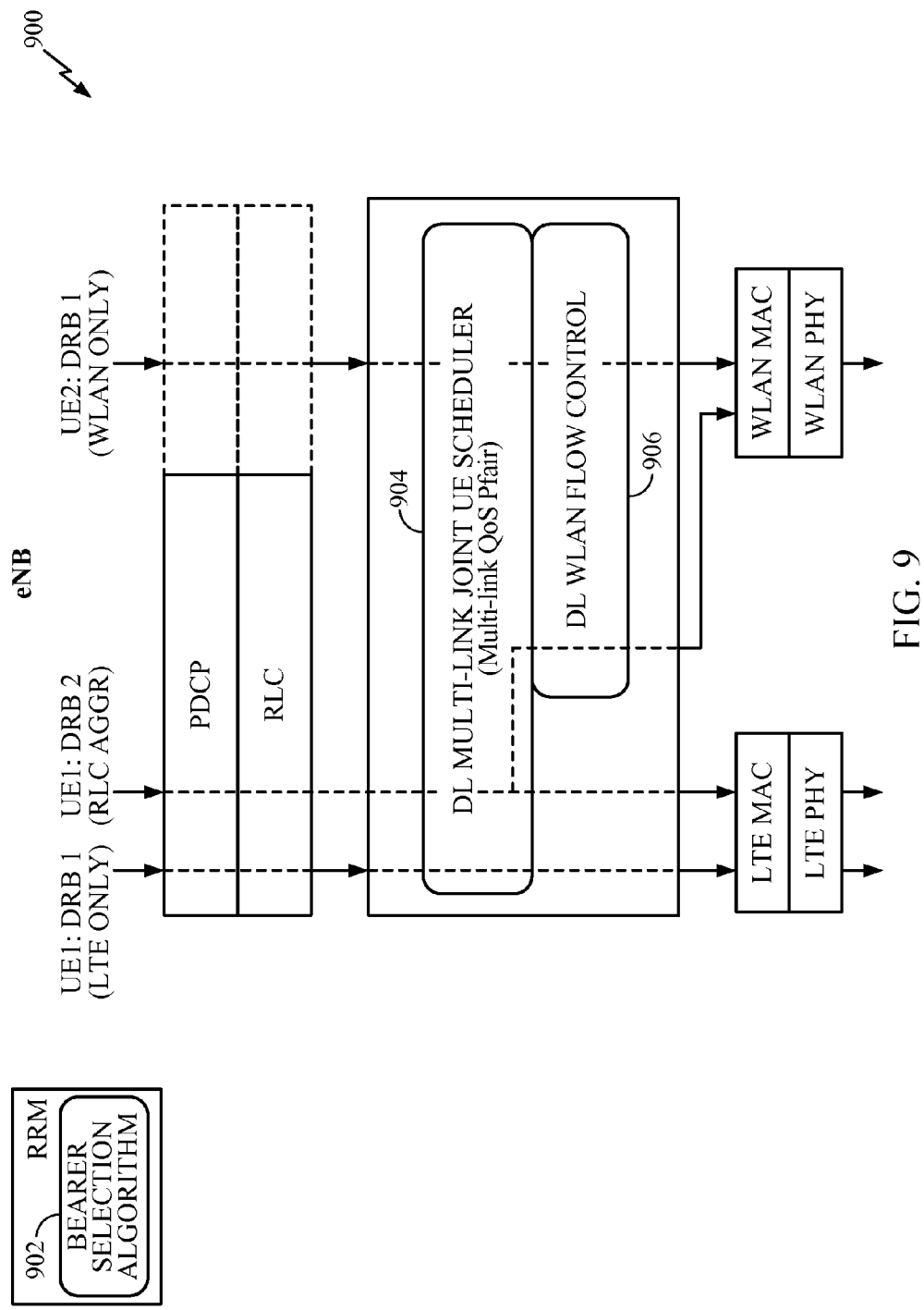
FIG. 9 illustrates an example data flow for joint support of UEs capable of communicating data of a same bearer on the first and second RATs simultaneously and UEs not capable of communicating data of a same bearer on the first and second RATs simultaneously using a joint a joint scheduler and a joint flow control module at the eNB, in accordance with certain aspects of the present disclosure.

According to aspects of the present disclosure, scheduling for both types of UEs described above may be performed using a bearer selection algorithm by an eNB that supports (e.g., considers, takes into account) both types of UEs. As will be described in more detailed herein, according to aspects, the eNB may use separate schedulers, as illustrated in FIG. 8, in an effort to independently schedule both types of UEs. According to aspects, a joint scheduler, as illustrated in FIG. 9, may be used to schedule both types of UEs. Based, at least in part, on the UE's capability of communicating data of a same bearer on the first and second RATs simultaneously, the eNB may select radio bearers for communicating with the UE.

Various aspects of the disclosure are described more fully hereinafter with reference to the accompanying drawings. Aspects of the disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3 GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

A base station ("BS") may comprise, be implemented as, or known as NodeB, Radio Network Controller ("RNC"), Evolved NodeB (eNodeB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A user equipment (UE) may comprise, be implemented as, or known as an access terminal, a subscriber station, a subscriber unit, a remote station, a remote terminal, a mobile station, a user agent, a user device, user equipment, a user station, or some other terminology. In some implementations, mobile station may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. In some aspects, the node is a wireless node. Such wireless node may provide, for example, connectivity for or to a network via a wired or wireless communication link.

An Example Wireless Communication System

Figure 1:
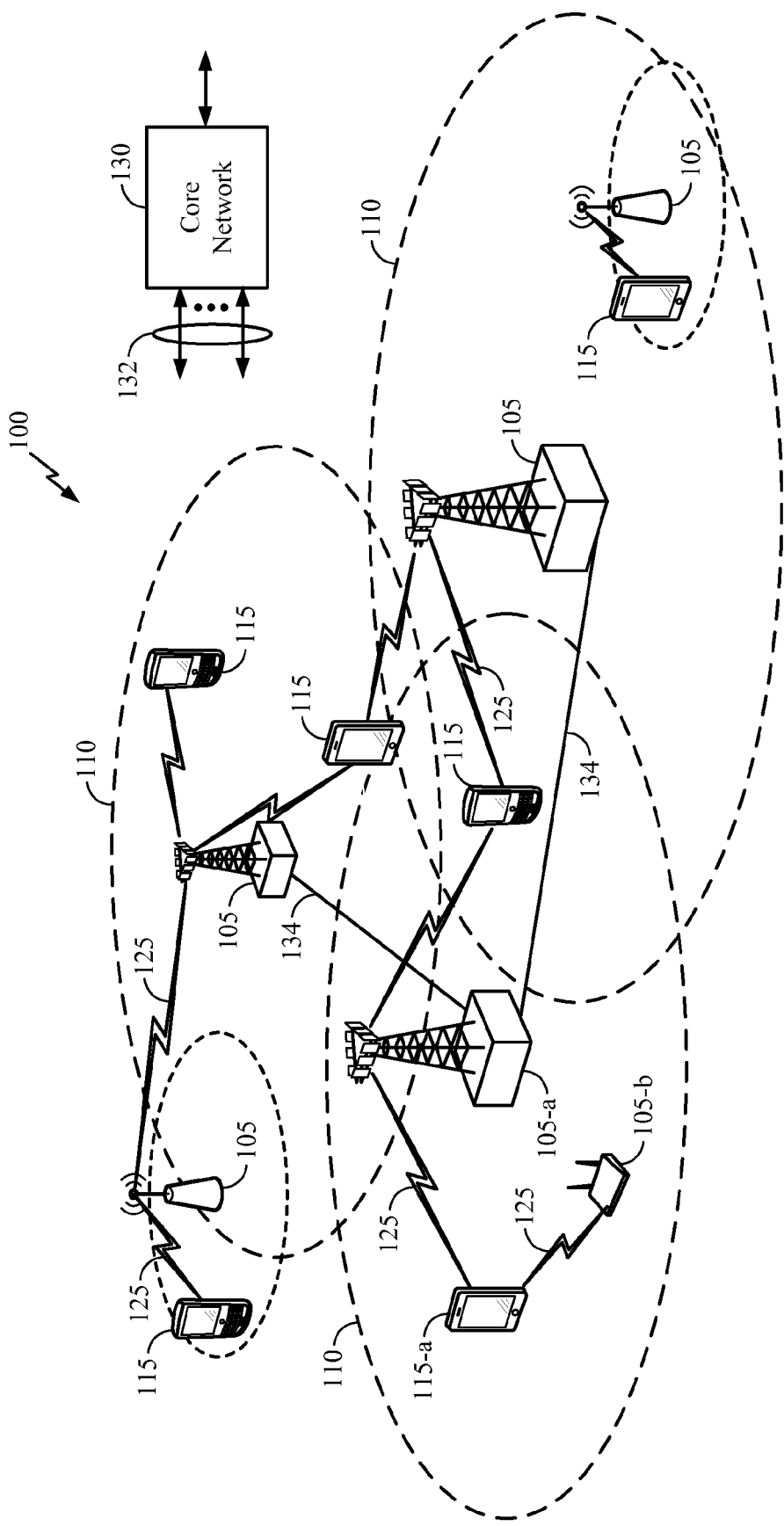
FIG. 1 illustrates an example wireless communication system, in accordance with aspects of the present disclosure.

FIG. 1 illustrates a multi-mode user equipment (UE) 115-a and an eNB 105 which may be configured according to aspects described herein. The multi-mode UE 115-a may be capable of communicating via multiple RATs. For example, the multi-mode UE 115-a may be able to communicate with a WWAN via an eNB 105-a and a WLAN via an access point 105-b. Accordingly, such a UE may be capable of communicating in a first and second RAT simultaneously. As will be described in more detail herein, an eNB 105 (e.g., 105-a) may jointly schedule UEs capable of communicating in a first and a second RAT simultaneously and UEs not capable of communicating in first and second RATs simultaneously.

Referring to FIG. 1, a multiple access wireless communication system in accordance with certain aspects of the present disclosure is illustrated. FIG. 1 illustrates an exemplary multi-mode UE 115-a. in a wireless communications system 100.

The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various embodiments. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In embodiments, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area (e.g., buildings) and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain examples, a UE 115 may be capable of simultaneously communicating with multiple eNodeBs 105. When multiple eNodeBs 105 support a UE 115, one of the eNodeBs 105 may be designated as the anchor eNodeB 105 for that UE 115, and one or more other eNodeBs 105 may be designated as the assisting eNodeBs 105 for that UE 115. For example, an assisting eNodeB 105 is associated with a local gateway communicatively coupled to a packet data network (PDN), core network resources may be conserved by offloading a portion of network traffic between the UE 115 and that PDN through the local gateway of the assisting eNodeB 105 rather than transmitting the traffic through the core network 130.

Figure 5A:
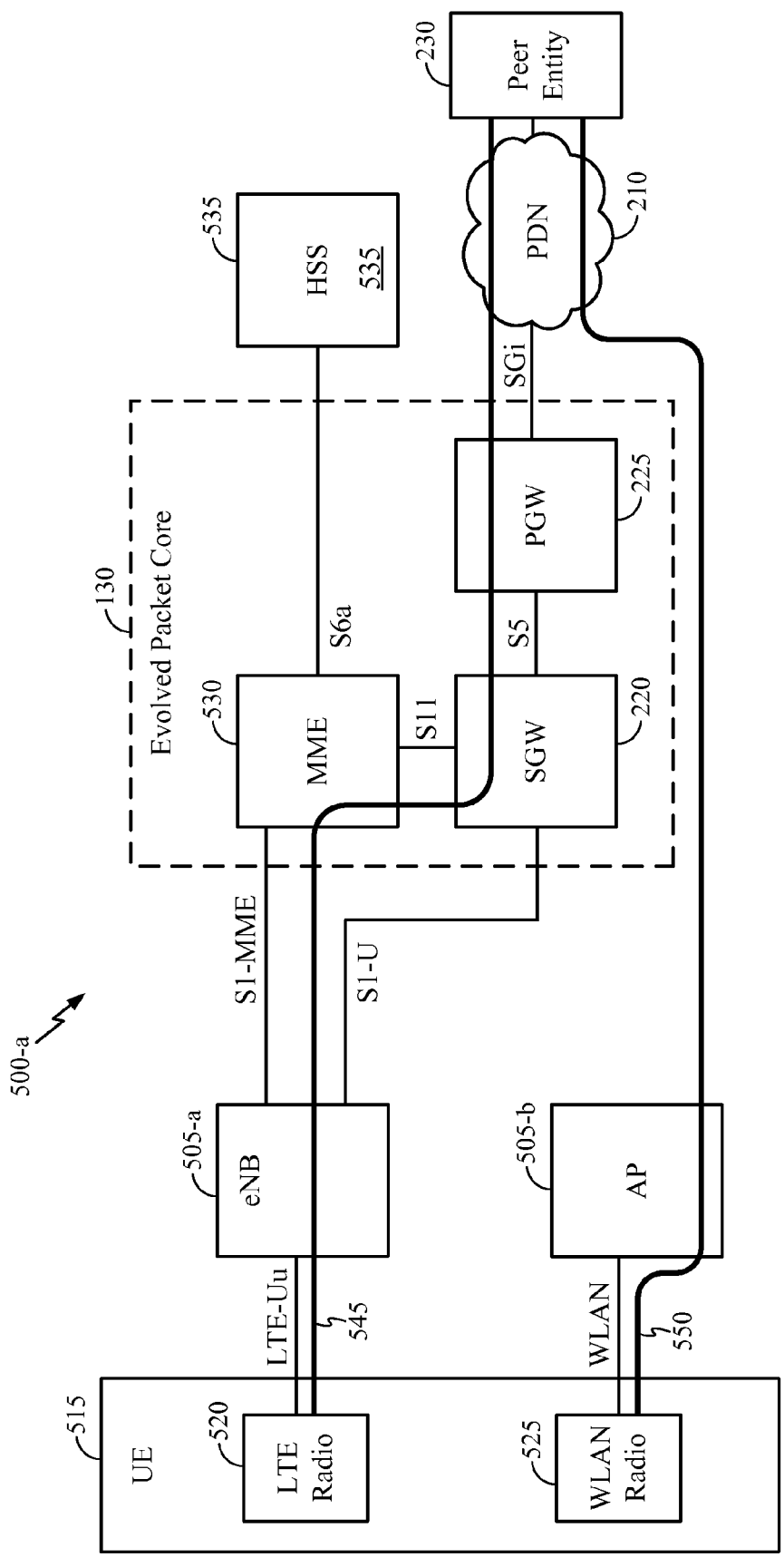
FIG. 5A illustrates an example reference architecture for non-co-located wireless local area network (WLAN) and a wireless wide area network (WWAN) access, in accordance with certain aspects of the present disclosure.
Figure 5B:
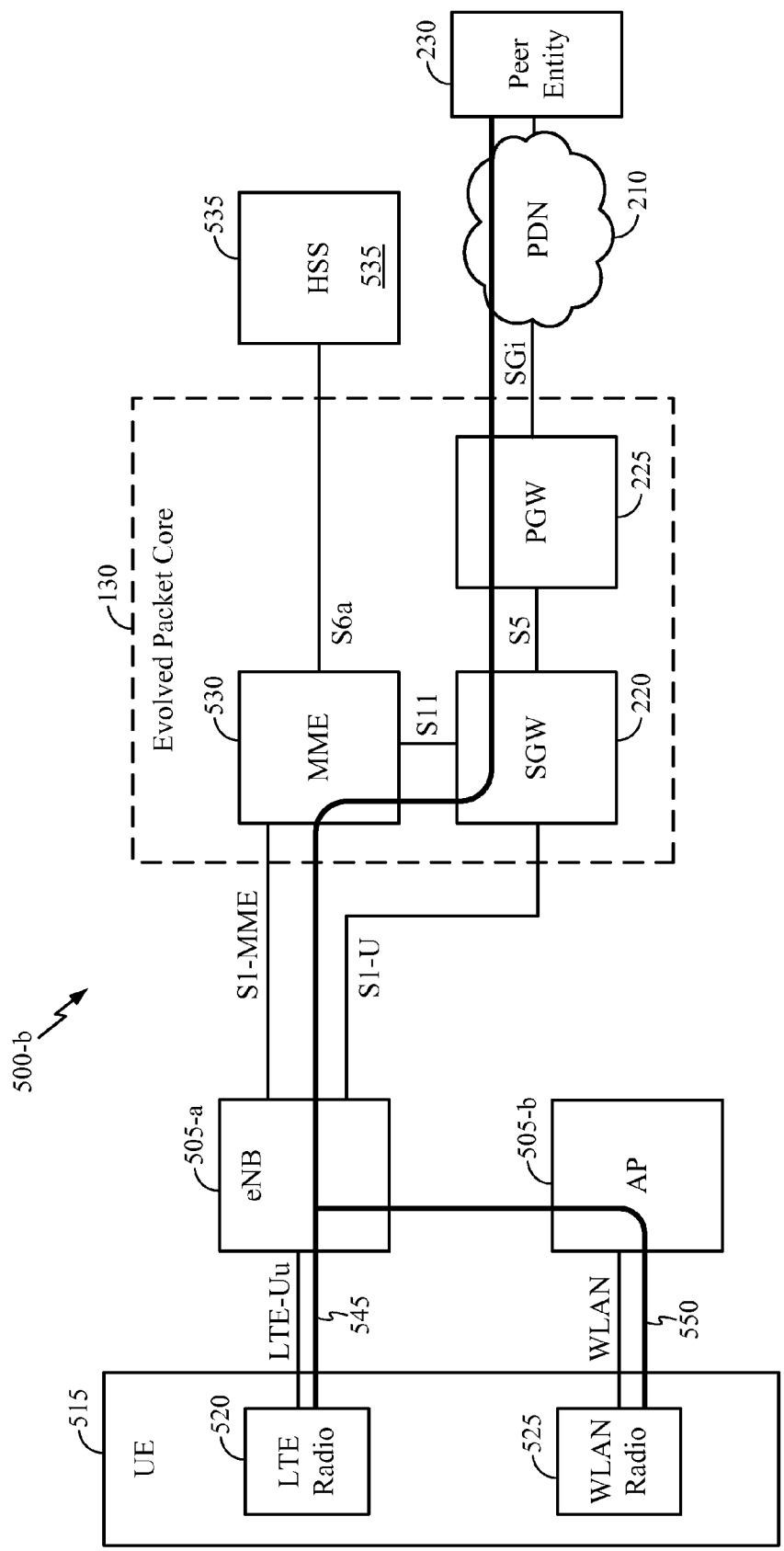
FIG. 5B illustrates an example reference architecture for a co-located wireless local area network (WLAN) and a wireless wide area network (WWAN) access interworking, in accordance with certain aspects of the present disclosure.

As described above, a multi-mode UE 115-a may be capable of communicating via multiple RATs. As such, for example, the UE 115-a may be able to communicate with a WWAN via an eNodeB 105-a and a WLAN via an access point 105-b. According to aspects, an eNB 105-a and an access point 105-b may be co-located as illustrated in FIG. 5B or non-co-located as illustrated in FIG. 5A.

Figure 2:
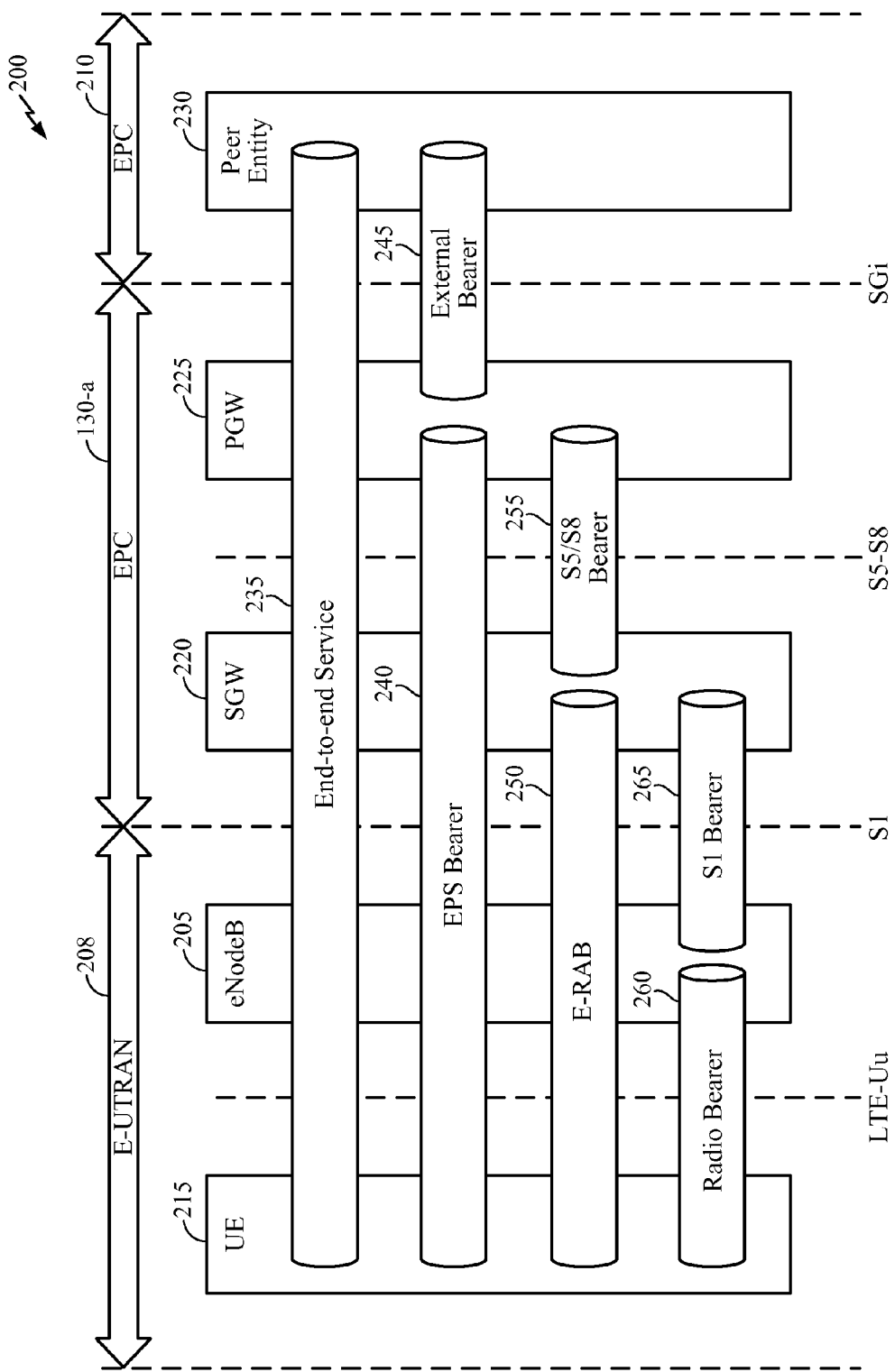
FIG. 2 is a block diagram conceptually illustrating an example of a bearer architecture in a wireless communications system, in accordance with aspects of the present disclosure.

FIG. 2 is a block diagram conceptually illustrating an example of a bearer architecture in a wireless communications system 200, in accordance with an aspect of the present disclosure. The illustrated UE 215 and eNB 205 of FIG. 2 may correspond to UEs 115 and eNBs 105 of FIG. 1, respectively.

A bearer establishes a "virtual" connection between two endpoints so that traffic can be sent between them. Accordingly, a bearer acts as a pipeline between the two endpoints. The bearer architecture may be used to provide an end-to-end service 235 between the UE 215 and a peer entity 230 addressable over a network.

The bearer architecture illustrated in FIG. 2 may be implemented in a wide area RAT, such as a WWAN. As noted above, a multi-mode UE may also be able to communicate with more than one RAT, as will be described in greater detail below with reference to, for example, FIGS. 4, 5A, and 5B. According to certain aspects, whether to switch bearers may be determined based, at least in part, on objectives of serving bearers with a "better" link for each bearer. According to certain aspects, the better link may be determined based in part on a user's channel conditions, traffic, and/or other users sharing the same link. So, the device may continuously determine the most appropriate link and may switch between 3G/4G and Wi-Fi (e.g., switch between WWAN and WLAN).

The peer entity 230 may be a server, another UE, or another type of network-addressable device. The end-to-end service 235 may forward data between UE 215 and the peer entity 230 according to a set of characteristics (e.g., QoS) associated with the end-to-end service 235. The end-to-end service 235 may be implemented by at least the UE 215, an eNodeB 205, a serving gateway (SGW) 220, a packet data network (PDN) gateway (PGW) 225, and the peer entity 230. The UE 215 and eNodeB 205 may be components of an evolved UMTS terrestrial radio access network (E-UTRAN) 208, which is the air interface of the LTE/LTE-A systems. The serving gateway 220 and PDN gateway 225 may be components of an evolved Packet Core (EPC) 130-a, which is the core network (e.g. 130 of FIG. 1) architecture of LTE/LTE-A systems. The peer entity 230 may be an addressable node on a PDN 210 communicatively coupled with the PDN gateway 225.

The end-to-end service 235 may be implemented by an evolved packet system (EPS) bearer 240 between the UE 215 and the PDN gateway 225, and by an external bearer 245 between the PDN gateway 225 and the peer entity 230 over an SGi interface. The SGi interface may expose an internet protocol (IP) or other network-layer address of the UE 215 to the PDN 210.

The EPS bearer 240 may be an end-to-end tunnel defined to a specific QoS. Access to PDN services and associated applications is provided to a UE by EPS bearers. Each EPS bearer 240 may be associated with a plurality of parameters, for example, a QoS class identifier (QCI), an allocation and retention priority (ARP), a guaranteed bit rate (GBR), and an aggregate maximum bit rate (AMBR). The QCI may be an integer indicative of a QoS class associated with a pre-defined packet forwarding treatment in terms of latency, packet loss, GBR, and priority. In certain examples, the QCI may be an integer from 1 to 9. The ARP may be used by a scheduler of an eNodeB 205 to provide preemption priority in the case of contention between two different bearers for the same resources. The GBR may specify separate downlink and uplink guaranteed bit rates. Certain QoS classes may be non-GBR such that no guaranteed bit rate is defined for bearers of those classes.

The EPS bearer 240 may be implemented by an E-UTRAN radio access bearer (E-RAB) 250 between the UE 215 and the serving gateway 220, and an S5/S8 bearer 255 between the serving gateway 220 and the PDN gateway over an S5 or S8 interface. S5 refers to the signaling interface between the serving gateway 220 and the PDN gateway 225 in a non-roaming scenario, and S8 refers to an analogous signaling interface between the serving gateway 220 and the PDN gateway 225 in a roaming scenario. The E-RAB 250 may be implemented by a radio bearer 260 between the UE 215 and the eNodeB 205 over an LTE-Uu air interface and by an S1 bearer 265 between the eNodeB and the serving gateway 220 over an S1 interface.

While FIG. 2 illustrates the bearer hierarchy in the context of an example of end-to-end service 235 between the UE 215 and the peer entity 230, certain bearers may be used to convey data unrelated to end-to-end service 235. For example, radio bearers 260 or other types of bearers may be established to transmit control data between two or more entities where the control data is unrelated to the data of the end-to-end service 235.

Figure 3:
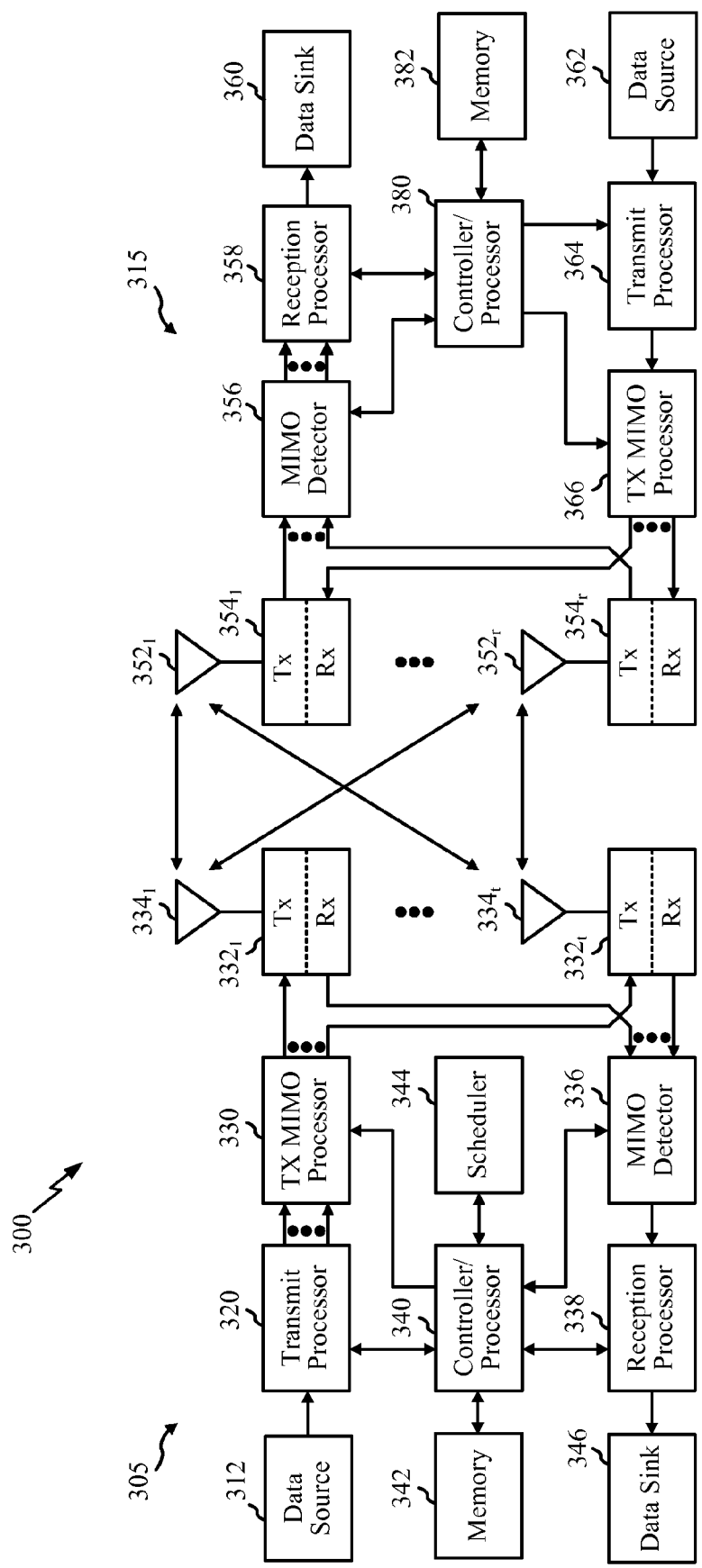
FIG. 3 is a block diagram conceptually illustrating an eNB and UE configured in accordance with aspects of the present disclosure.

FIG. 3 is a block diagram conceptually illustrating an eNodeB 305 and an UE 315 configured in accordance with aspects of the present disclosure. For example, the components of UE 315 may be included in the multi-mode UE 115-a and the components of eNB 305 may be included in the eNB 105 as shown in FIG. 1. As described herein one or more components of the base station 305 including, for example, antenna 334, Tx/Rx 332, controller/processor 340, scheduler 344, and memory 342 may implement aspects of joint scheduling for UEs capable of communicating data of a same bearer on a first and second RAT simultaneously and UEs not capable of such communication.

The base station 305 may be equipped with antennas $334_{1-t}$, and the UE 315 may be equipped with antennas $352_{1-r}$, wherein t and r are integers greater than or equal to one. At the base station 305, a base station transmit processor 320 may receive data from a base station data source 312 and control information from a base station controller/processor 340. The control information may be carried on the Physical Broadcast Channel (PBCH), Physical Control Format Indicator Channel (PCFICH), Physical Hybrid-ARQ Indicator Channel (PHICH), Physical Downlink Control Channel (PDCCH), etc. The data may be carried on the Physical Downlink Shared Channel (PDSCH), etc. The base station transmit processor 320 may process (e.g., encode and symbol map) the data and control information to obtain data symbols and control symbols, respectively. The base station transmit processor 320 may also generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to the base station transceivers (Tx/Rx) $332_{1-t}$. Each base station transceiver 332 may process a respective output symbol stream (e.g., for OFDM, etc.) to obtain an output sample stream. Each base station transceiver 332 may further process (e.g., convert to analog, amplify, filter, and upconvert) the output sample stream to obtain a downlink signal. Downlink signals from Tx/Rx $332_{1-t}$ may be transmitted via the antennas $334_{1-t}$, respectively.

At the UE 315, the UE antennas $352_{1-r}$ may receive the downlink signals from the base station 305 and may provide received signals to the UE transceivers (Tx/Rx) $354_{1-r}$, respectively. Each UE Tx/Rx 354 may condition (e.g., filter, amplify, downconvert, and digitize) a respective received signal to obtain input samples. Each UE Tx/Rx 354 may further process the input samples (e.g., for OFDM, etc.) to obtain received symbols. A UE MIMO detector 356 may obtain received symbols from all the UE Tx/Rx $354_{1-r}$, and perform MIMO detection on the received symbols if applicable, and provide detected symbols. A UE reception processor 358 may process (e.g., demodulate, deinterleave, and decode) the detected symbols, provide decoded data for the UE 315 to a UE data sink 360, and provide decoded control information to a UE controller/processor 380.

On the uplink, at the UE 315, a UE transmit processor 364 may receive and process data (e.g., for the PUSCH) from a UE data source 362 and control information (e.g., for the PUCCH) from the UE controller/processor 380. The UE transmit processor 364 may also generate reference symbols for a reference signal. The symbols from the UE transmit processor 364 may be precoded by a UE TX MIMO processor 366 if applicable, further processed by the UE Tx/Rx $354_{1-r}$ (e.g., for SC-FDM, etc.), and transmitted to the base station 305. At the base station 305, the uplink signals from the UE 315 may be received by the base station antennas 334, processed by the base station Tx/Rx 332, detected by a base station MIMO detector 336 if applicable, and further processed by a base station reception processor 338 to obtain decoded data and control information sent by the UE 315. The base station reception processor 338 may provide the decoded data to a base station data sink 346 and the decoded control information to the base station controller/processor 340.

As described above, the base station controller/processor 340 and the UE controller/processor 380 may direct the operation at the base station 305 and the UE 315, respectively. The base station controller/processor 340 and/or other processors and modules at the base station 305 may perform or direct, e.g., the execution of various processes for the techniques described herein. The eNB controller/processor 340 and/or other processors and modules at the eNodeB 305 may also perform or direct, e.g., the execution of the functional blocks illustrated in FIG. 10 and FIG. 11, and/or other processes for the techniques described herein. The base station memory 342 and the UE memory 382 may store data and program codes for the base station 305 and the UE 315, respectively. A scheduler 344 may schedule UEs 315 for data transmission on the downlink and/or uplink. The antenna 334, Tx/Rx 332 of eNB 300 may be used to communicated with the UE with the selected radio bearers.

Figure 4:
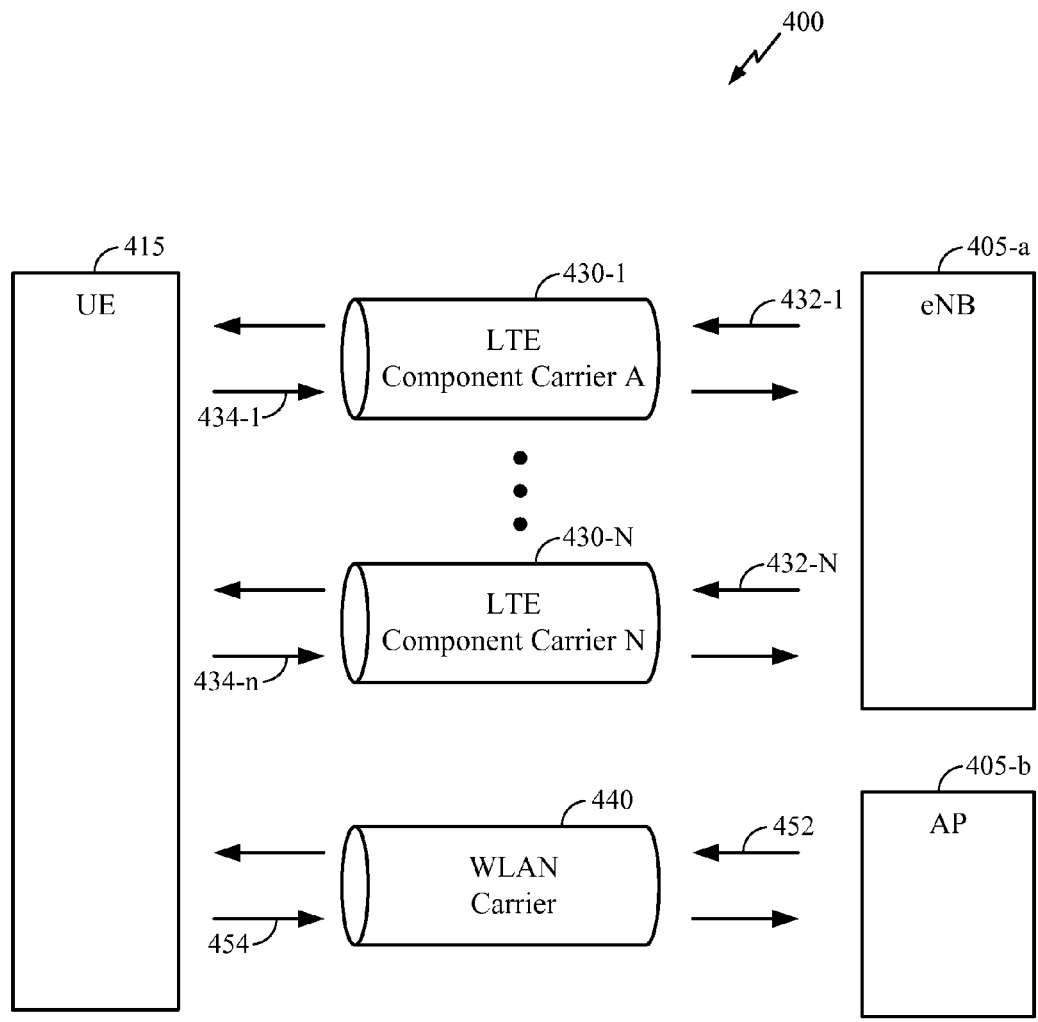
FIG. 4 illustrates a block diagram conceptually illustrating an aggregation of wireless local area network (WLAN) and a wireless wide area network (WWAN) radio access technologies (RATs) at a UE, in accordance with aspects of the present disclosure.

FIG. 4 illustrates a block diagram conceptually illustrating an aggregation of LTE and WLAN radio access technologies at a user equipment (UE), in accordance with an aspect of the present disclosure. The aggregation may occur in a system 400 including a multi-mode UE 415, which can communicate with an eNodeB 405-a using one or more component carriers 1 through N (CC1-CCN), and with a WLAN access point (AP) 405-b using WLAN carrier 440. The eNodeB 405-a may be an example of one or more of the eNodeBs or base stations 105 and the UE 415 may be an example of one or more of the UEs 115 as described above with reference to the previous Figures.

While only one UE 415, one eNodeB 405-a, and one AP 405-b are illustrated in FIG. 4, it will be appreciated that the system 400 can include any number of UEs 415, eNodeBs 405-a, and/or APs 405-b.

The eNodeB 405-a can transmit information to the UE 415 over forward (downlink) channels 432-1 through 432-N on LTE component carriers CC1 through CCN 430. In addition, the UE 415 can transmit information to the eNodeB 405-a over reverse (uplink) channels 434-1 through 434-N on LTE component carriers CC1 through CCN. Similarly, the AP 405-b may transmit information to the UE 415 over forward (downlink) channel 452 on WLAN carrier 440. In addition, the UE 415 may transmit information to the AP 405-b over reverse (uplink) channel 454 of WLAN carrier 440.

In describing the various entities of FIG. 4, as well as other figures associated with some of the disclosed embodiments, for the purposes of explanation, the nomenclature associated with a 3GPP LTE or LTE-A wireless network is used. However, it is to be appreciated that the system 400 can operate in other networks such as, but not limited to, an OFDMA wireless network, a CDMA network, a 3GPP2 CDMA2000 network and the like. Mobile operators may be able to control which traffic is routed over WLAN and which one is kept on WWAN (such as 3GPP RAN). For example, some data flows (e.g., related to VoIP or other operators' services) can be served on WAN to leverage its QoS capabilities, while IP flows related to "best-effort" Internet traffic can be offloaded to WLAN. With interworking, the performance of each of the available links are autonomously evaluated on a real-time basis, without any user intervention, and the best possible link for each data bearer is selected. The performance estimation looks at a multitude of parameters including both the radio access and end-to-end perspective.

Some of the parameters considered for the decision include signal and channel quality, available bandwidth, latency, as well as the operator policies regarding which applications and services are allowed to be moved to Wi-Fi and which are restricted to 3GPP RAN.

FIGS. 5A and 5B are block diagrams conceptually illustrating examples of data paths 545, 550 between a UE 515 and a PDN (e.g., the Internet), in accordance with aspects of the present disclosure. The UE 515 may be an example of UE 115-a or UE 415 described above with reference to FIGS. 1 and 4, respectively and may include one or more components of UE 315 as illustrated in FIG. 3. In FIG. 5A, the eNB and AP may be non-co-located (e.g., not in high-speed communication with each other). In FIG. 5B, the eNB and AP may be co-located (e.g., in high-speed communication with each other).

The data paths 545, 550 are shown within the context of a wireless communication system 500-a, 500-b aggregating WLAN and LTE radio access technologies. In each example, the wireless communication system 500-a and 500-b, shown in FIGS. 5A and 5B, respectively, may include a multi-mode UE 515, an eNodeB 505-a, a WLAN AP 505-b, an evolved packet core (EPC) 130, a PDN 210, and a peer entity 230. The EPC 130 of each example may include a mobility management entity (MME) 505, a serving gateway (SGW) 220, and a PDN gateway (PGW) 225. A home subscriber system (HSS) 535 may be communicatively coupled with the MME 530. The UE 515 of each example may include an LTE radio 520 and a WLAN radio 525. These elements may represent aspects of one or more of their counterparts described above with reference to the previous Figures.

Referring specifically to FIG. 5A, the eNodeB 505-a and AP 505-b may be capable of providing the UE 515 with access to the PDN 210 using the aggregation of one or more LTE component carriers or one or more WLAN component carriers. Using this access to the PDN 210, the UE 515 may communicate with the peer entity 230. The eNodeB 505-a may provide access to the PDN 210 through the evolved packet core 130 (e.g., through path 545), and the WLAN AP 505-b may provide direct access to the PDN 210 (e.g., through path 550).

The MME 530 may be the control node that processes the signaling between the UE 515 and the EPC 130. Generally, the MME 530 may provide bearer and connection management. The MME 530 may, therefore, be responsible for idle mode UE tracking and paging, bearer activation and deactivation, and SGW selection for the UE 515. The MME 530 may communicate with the eNodeB 505-a over an S1-MME interface. The MME 530 may additionally authenticate the UE 515 and implement Non-Access Stratum (NAS) signaling with the UE 515.

The HSS 535 may, among other functions, store subscriber data, manage roaming restrictions, manage accessible access point names (APNs) for a subscriber, and associate subscribers with MMEs 530. The HSS 535 may communicate with the MME 530 over an Sha interface defined by the Evolved Packet System (EPS) architecture standardized by the 3 GPP organization.

All user IP packets transmitted over LTE may be transferred through eNodeB 505-a to the SGW 220, which may be connected to the PDN gateway 225 over an S5 signaling interface and the MME 530 over an S11 signaling interface. The SGW 220 may reside in the user plane and act as a mobility anchor for inter-eNodeB handovers and handovers between different access technologies. The PDN gateway 225 may provide UE IP address allocation as well as other functions.

The PDN gateway 225 may provide connectivity to one or more external packet data networks, such as PDN 210, over an SGi signaling interface. The PDN 210 may include the Internet, an Intranet, an IP Multimedia Subsystem (IMS), a Packet-Switched (PS) Streaming Service (PSS), and/or other types of PDNs.

In the present example, user plane data between the UE 515 and the EPC 130 may traverse the same set of one or more EPS bearers, irrespective of whether the traffic flows over path 545 of the LTE link or path 550 of the WLAN link. Signaling or control plane data related to the set of one or more EPS bearers may be transmitted between the LTE radio 520 of the UE 515 and the MME 530 of the EPC 130-b, by way of the eNodeB 505-a.

FIG. 5B illustrates an example system 500-b in which the eNodeB 505-a and AP 505-b are co-located or otherwise in high-speed communication with each other. In this example, EPS bearer-related data between the UE 515 and the WLAN AP 505-b may be routed to the eNodeB 505-a, and then to the EPC 130. In this way, all EPS bearer-related data may be forwarded along the same path between the eNodeB 505-a, the EPC 130, the PDN 210, and the peer entity 230.

Joint Support for UEs Capable of Communicating
Data of a Same Bearer on Multiple Rats and UEs
not Capable of Communicating Data of a Same
Bearer on Multiple Rats In general, an eNB may support downlink packet routing for centralized LTE and WLAN multi-link scheduling with WLAN flow control for WLAN buffer management. For uplink, the eNB may combine LTE and WLAN links served for computing user priority metrics. The UE may support uplink WLAN flow control for WLAN buffer management. For example, UL transmissions may be scheduled in LTE (e.g., when an UL PDCCH grant is received and data is available) or in WLAN (e.g., every $T_{sch}$ interval, if data is available).

According to aspects of the present disclosure, packet level routing may be improved by utilizing both links (e.g., LTE and WiFi). As will be described in more detail herein, aspects of the present disclosure provide inter-UE fairness.

Figure 6:
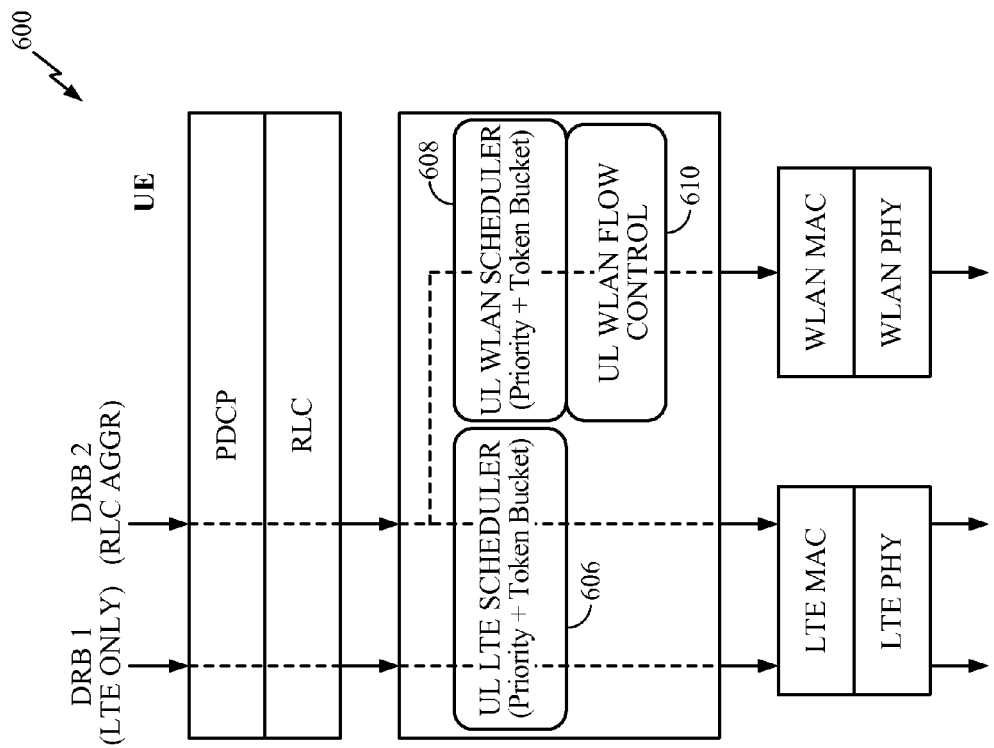
FIG. 6 illustrates an example data flow for a UE capable of communicating data of a same bearer on the first and second RATs simultaneously (e.g., capable of RLC aggregation and/or PDCP aggregation), in accordance with certain aspects of the present disclosure.
Figure 6:
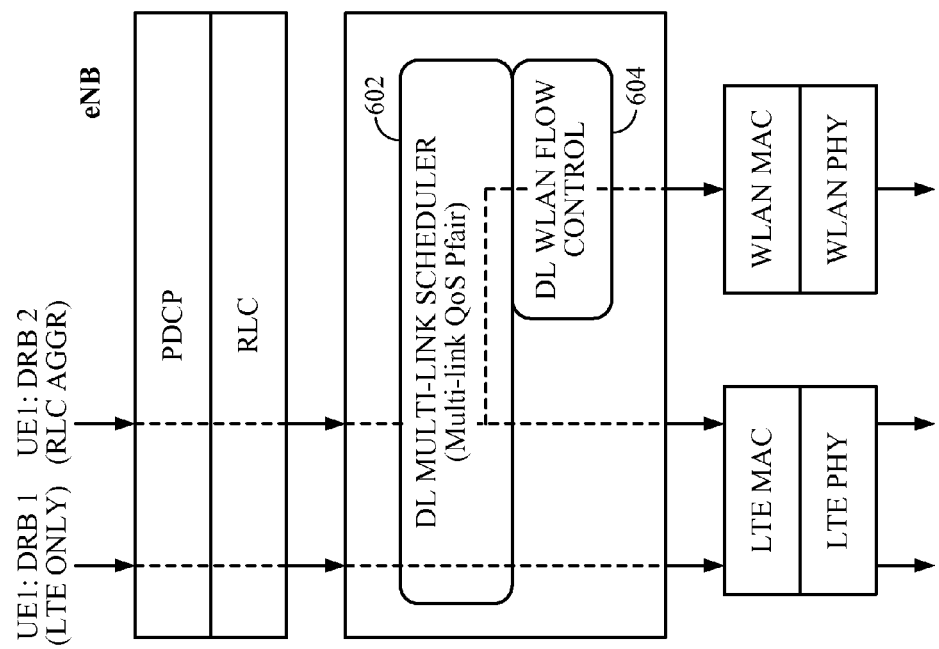

FIG. 6 illustrates an example data path architecture 600, according to aspects of the present disclosure. At the eNB, a first data radio bearer (DRB 1) may be used for DL transmission to a UE for LTE data packets. At the eNB, a second DRB (DRB 2) may be used for DL transmission to the UE for communicating data of a same bearer on multiple RATs simultaneously.

As described herein, a UE capable of communicating data of a same bearer on more than one RAT simultaneously may be described as a UE capable of performing Radio Link Control (RLC) aggregation or a UE capable of performing Packet Data Convergence Protocol (PDCP) aggregation. An RLC aggregation capable UE may transmit RLC packets over multiple RATs simultaneously. A PDCP aggregation capable UE may transmit PDCP packets over multiple RATs simultaneously. As illustrated in FIG. 6, the UE may be capable of receiving and transmitting data of a same bearer in both LTE and WLAN on DRB 2.

For DRB 1 in FIG. 6, one or more DL data packets for the UE may flow from the PDCP and RLC layer, to a DL multi-link scheduler 602, to the LTE Media Access Control (MAC) and LTE Physical (PHY) layer.

For DRB 2, one or more DL data packets for the UE may flow from the PDCP and RLC layer, to the DL multi-link scheduler 602, to the LTE MAC and LTE PHY layers, similar to data packets of DRB 1. DL data packets of DRB 2 may also flow from the DL multi-link scheduler 602 to a DL WLAN flow control module 604. The multi-link scheduler 602 may use a proportional fair scheduler, wherein the scheduler may balance system throughput while serving users taking fairness into account. Thereafter, the data packets may flow from the DL flow control module 604 to the WLAN MAC and WLAN PHY layers. In this manner, data packets on DRB 2 may be simultaneously communicated (e.g., transmitted) in both LTE and WLAN.

According to aspects, when making scheduling decisions, the DL multi-link scheduler 602 may consider all UEs which the scheduler may schedule. The DL multi-link scheduler 602 may schedule UEs based on QoS considerations, taking inter-UE fairness into account. The multi-link scheduler 602 may use a proportional fair scheduler, wherein the scheduler may balance system throughput while serving users in a manner taking fairness into account.

On the uplink, LTE data packets on DRB 1 (e.g., for LTE) may flow from the PDCP and RLC layers at the UE, to a UL LTE scheduler 606, to the LTE MAC and LTE PHY layers.

Data packets of DRB 2 may be processed through the PDCP and RLC layers. Thereafter, data packets may be scheduled, according to a first path, using the UL LTE scheduler and may subsequently pass to the LTE MAC and LTE PHY layer. Data packets of DRB 2 may also follow a second path from the PDCP and RLC layers to the UL WLAN scheduler 608 to the WLAN MAC and WLAN PHY layer. In this manner, DRB 2 data packets may be capable of being communicated by the UE on a same bearer on multiple RATs simultaneously.

Figure 7:
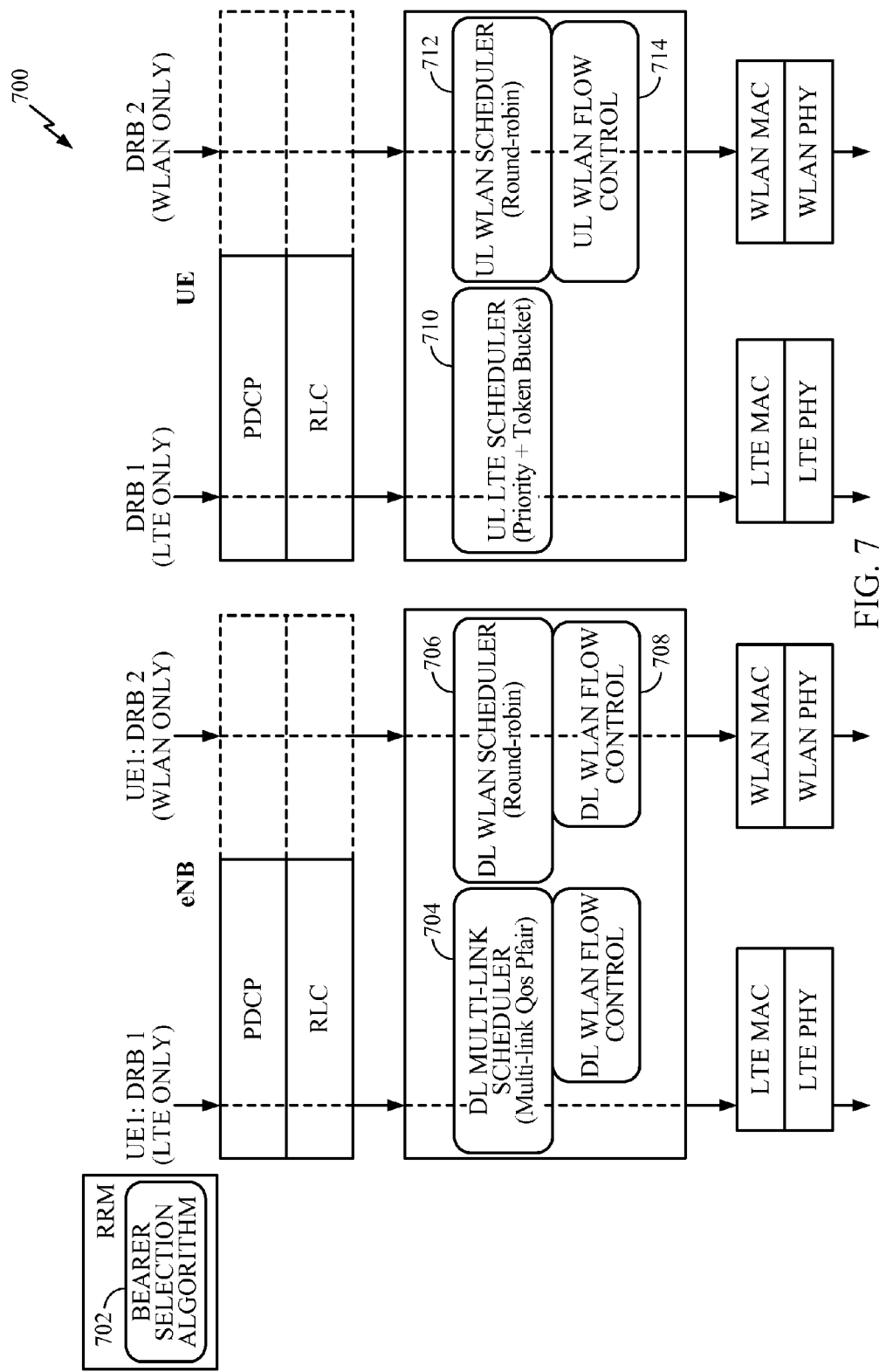
FIG. 7 illustrates an example data flow for a UE not capable of communicating data of a same bearer on the first and second RATs simultaneously, in accordance with certain aspects of the present disclosure.

FIG. 7 illustrates an example data path architecture 700 for bearer-selection only capable UEs, according to aspects of the present disclosure. As described below, an eNB may implement a bearer selection algorithm 702, for example, at a radio resource management (RRM) module. The UE may be assigned to DRB 1 and DRB 2 where DRB 1 may be configured for LTE data packets only and DRB 2 may be configured for WLAN packets only.

For bearer level mapping, UE-reported WLAN measurements may be used to activate/deactivate WLAN interworking. A bearer type may be configured to LTE-only upon establishment of radio bearers and may be reconfigured, for example, based on UE reported WLAN measurements. According to aspects, a bearer type may be LTE-only, bearers for a UE capable of communicating data for a same bearer on first and second RATs simultaneously (e.g., RLC-aggregation and/or PDCP-aggregation), or WLAN-only. For bearer-selection only capable UEs, the bearer type may be LTE-only or WLAN-only.

Radio Resource Control (RRC) connection reconfiguration signaling procedures may be used to reconfigure bearer mapping to a radio link for bearer-selection only capable UEs. For bearer-selection only capable UEs, packet routing decisions may be performed above the PDCP layer.

As described above, the activation and/or deactivation of WLAN for bearer level routing for bearer-selection only capable UEs may be based on WLAN measurements taken by the UE. eNBs may support bearer selection algorithms with HetNet features enabled and may support end-to-end data connectivity for bearers on LTE and WLAN.

For bearer-selection only UEs, eNBs and UEs may support flow control with WLAN in an effort to minimize packets buffered, for example, during bearer reconfiguration. The eNB may schedule all WLAN-only bearers using a separate scheduling algorithm (e.g., a round-robin policy, a first-in, first-out policy). The WLAN scheduling algorithm may be situated below the RLC layer and above the LTE/WLAN MAC layers, as illustrated in FIG. 7.

For the UL, the UE may schedule all WLAN-only bearers using a separate scheduling algorithm (e.g., a round-robin policy, a first-in, first-out policy) than LTE only DRBs. Similar to the eNB, the WLAN scheduling algorithm at the UE may be situated below the RLC layer and above the LTE and WLAN MAC layers.

For the DL, LTE data packets of DRB 1 may pass through the PDCP and RLC layers. Next, these data packets may flow through a DL multi-link scheduler 704 and then to the LTE MAC and LTE PHY layers. The multi-link scheduler 704 may use a proportional fair scheduler, wherein the scheduler may balance system throughput while serving users taking fairness into account.

For the DL, WLAN packets of DRB 2, may be routed through a DL WLAN scheduler 706 and a DL flow control module 708. Next, these WLAN packets may flow through the WLAN MAC and WLAN PHY layers. DL WLAN scheduler 706 may utilize a round-robin, first-in, first-out scheduling algorithm where, for example, QoS parameters and/or logical channel prioritization are not considered.

On the UL, LTE packets of DRB 1 may pass through the PDCP and RLC layers. Next, these packets may be routed to a UL LTE scheduler 710 and then to the LTE MAC and LTE PHY layers. The scheduler 710 may utilize a priority and token bucket scheduling algorithm, wherein conformant data packets are collected in a hypothetical bucket and passed along from the bucket for UL transmission when the bucket is filled to a maximum capacity. If the bucket is not yet filled to capacity, packets are delayed until the bucket fills with sufficient, compliant packets. In this manner, a priority plus token bucket scheduling algorithm may conform to defined limits on system bandwidth and burstiness while taking the priority of the packet into account.

For the UL, WLAN packets of DRB 2 may be routed to a UL WLAN scheduler 712 and UL WLAN flow control module 714. The scheduler 712 may utilize a round-robin or first-in, first-out scheduling algorithm. WLAN packets may then be routed to the WLAN MAC and WLAN PHY layers.

As illustrated in FIG. 7, for the UL and DL, the PDCP and RLC may perform transparent-mode processing for WLAN-only radio bearers.

Joint Support

According to aspects of the present disclosure, an eNB may support service to both types of UEs, those capable of communicating data of a same bearer on first and second RATs simultaneously (e.g., UEs capable of RLC aggregation and/or PDCP aggregation, as illustrated in FIG. 6) and those not capable of communicating data of a same bearer on first and second RATs simultaneously (e.g., UEs capable of bearer-selection only, as illustrated in FIG. 7).

According to a first example, which will be described in more detail with reference to FIG. 8, bearers for communicating data of a same bearer on a first and second RAT and WLAN-only bearers may be scheduled at an eNB using separate schedulers and separate WLAN flow control modules. While UEs capable of communicating data of a same bearer on first and second RATs simultaneously (e.g., RLC aggregation-capable UEs and/or PDCP aggregation-capable UEs) and WLAN-only UEs may be scheduled independently (e.g., using separate schedulers 804, 808), processing and/or scheduling of RLC-aggregation bearers may be deliberately performed immediately before WLAN-only bearers, or vice versa.

FIG. 8 illustrates an example data path architecture 800, according to aspects of the present disclosure. The eNB may implement a bearer selection algorithm 802, for example, at a RRM module. Bearer selection algorithm 802 may differ from bearer selection algorithm 702 of FIG. 7. For example, bearer selection algorithm 802 may consider both types of UEs for joint scheduling, those capable of communicating data of a same bearer on first and second RATs simultaneously and those capable of bearer-selection only, whereas bearer section algorithm 702 did not consider UEs capable of RLC or PDCP aggregation.

DRB 1 for UE1 may be configured for LTE data packets only, DRB 2 for UE1 may be configured for communicating data of a same bearer on first and second RATs simultaneously, and DRB 1 for UE2 may be configured for WLAN packets only.

For DRB 1 and DRB 2 for UE1, packets may pass through the PDCP and RLC layers, to a DL multi-link scheduler 804. The DL multi-link scheduler 804 may use a QoS based scheduling algorithm. As an example, the QoS based scheduling may take into account logical channel prioritization and/or bearer classification prioritization for WiFi. A QoS scheduling algorithm may assume that logical channels are classified into different groups. Thereafter, a proportional fair prioritization may be applied within each of the groups. The groups may be scheduled in order of their respective priority. However other techniques that utilize QoS parameters may be used by the multi-link scheduler 804.

For DRB 1 of UE1, the packets may be routed from the multi-link scheduler 804 to the LTE MAC and LTE PHY layers. For DRB 2 of UE1, the packets may be routed from the multi-link scheduler 804 to the LTE MAC and PHY layers according to a first path and from the multi-link scheduler 804 to DL WLAN flow control module 806 according to a second path. From the DL flow control module 806, the packets may be routed to the WLAN MAC and PHY layers for transmission to UE1. In this manner, the packets of DRB 2 for UE1 may be simultaneously communicated in LTE and WLAN.

For DRB 1 of UE2, WLAN packets may be transparently processed by the PDCP and RLC layers. Thereafter, the WLAN packets may be routed to a DL WLAN scheduler 808 and a DL WLAN flow control module 810. Next, the WLAN packets may be routed to the WLAN MAC and PHY layers. The DL WLAN scheduler 808 may use a round-robin or first-in, first-out scheduling algorithm, which does not take logical channel prioritization into account in making scheduling decisions. For example, the DL WLAN scheduler 808 may treat all bearers equally and serve the bearers in a round-robin manner.

While FIG. 8 illustrates separate schedulers (804 and 808) for UEs capable of communicating data of a same bearer on a first and second RAT simultaneously and UEs capable of bearer-selection only, according to aspects of the disclosure, the scheduling for one type of UE may be performed just before the other type of UE.

According to a second example, which will be described in more detail with reference to FIG. 9, all UEs (UEs capable of communicating data of a same bearer on first and second RATs simultaneously and UEs capable of bearer-selection only) may be jointly flow controlled using a single DL multi-link joint UE scheduler by the eNB. This single DL scheduler may be situated below the RLC layer and above the MAC layer as illustrated in FIG. 9.

FIG. 9 illustrates an example data path architecture 900, according to aspects of the present disclosure. Similar to bearer selection algorithm 802 of FIG. 8, bearer selection algorithm 902 in the RRM of the eNB may differ from bearer selection algorithm 702 of FIG. 7. For example, bearer selection algorithm 902, similar to bearer selection algorithm 802, may consider both types of UEs for joint scheduling, those capable of communicating data of a same bearer on first and second RATs simultaneously and those capable of bearer-selection only.

DRB 1 for UE1 may be configured for LTE data packets only, DRB 2 for UE1 may be configured for communicating data of a same bearer on a first and second RAT simultaneously, and DRB 1 for UE2 may be configured for WLAN packets only.

For DRB 1 and DRB 2 for UE1, packets may pass through the PDCP and RLC layers to a DL multi-link joint scheduler 904. For DRB 1, the packets may be routed from the multi-link joint scheduler 904 to the LTE MAC and LTE PHY layers. For DRB 2, the packets may be routed from the multi-link joint scheduler 904 to the LTE MAC and LTE PHY layers according to a first path as well as from the multi-link joint scheduler 904 to a DL WLAN flow control module 906 according to a second path. According to aspects, the DL multi-link joint scheduler 904 may use a QoS based scheduling algorithm, taking all UEs into account. As described with reference to DL multi-link scheduler 804 in FIG. 8, the QoS based scheduling may take into account logical channel prioritization and/or bearer classification prioritization for WiFi. A QoS scheduling algorithm may assume that logical channels are classified into different groups. Thereafter, a proportional fair prioritization may be applied within each of the groups. The groups may be scheduled in order of their respective priority. However other techniques that utilize QoS parameters may be used by the multi-link scheduler 904.

From the DL flow control module 906, the packets for UE 1 of DRB 2 may be routed to the WLAN MAC and WLAN PHY layer. In this manner, the packets of DRB 2 for UE1 may be simultaneously communicated in LTE and WLAN.

For DRB 1 for UE2, WLAN packets may be transparently processed by the PDCP and RLC layers. Thereafter, the WLAN packets may be routed to the DL multi-link joint scheduler 904 and to the DL WLAN flow control module 906. From the DL WLAN flow control module 906, the WLAN packets may be routed to the WLAN MAC and PHY layers.

Figure 10:
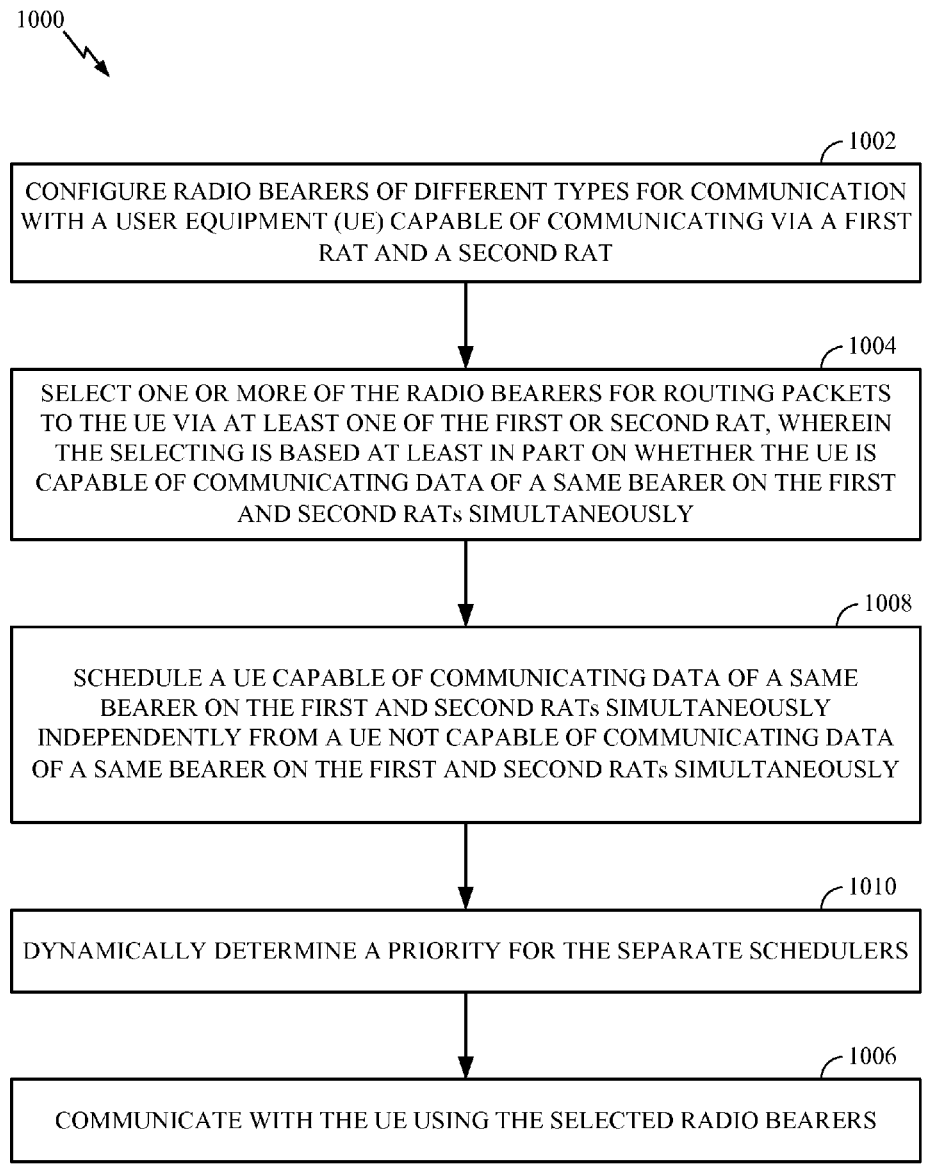
FIG. 10 illustrates operations performed, for example, by an eNB, according to aspects of the present disclosure.

FIG. 10 illustrates example operations 1000 performed, for example, by an eNB of a first RAT according to aspects of the present disclosure. The operations may performed by an eNB, including one or more components as illustrated in FIG. 3. As described above, antenna 334, Tx/Rx 332, controller/processor 340, scheduler 344, and memory 342 may implement aspects of joint scheduling for UEs capable of communicating data of a same bearer on a first and second RAT simultaneously and UEs not capable of such communication, in accordance with aspects described herein.

At 1002, the eNB may configure radio bearers of different types for communication with a UE capable of communicating via a first RAT and a second RAT. At 1004, the eNB may select one or more of the radio bearers for routing packets to the UE via at least one of the first or second RAT, wherein the selecting is based at least in part on whether the UE is capable of communicating data of a same bearer on the first and second RATs simultaneously. At 1006, the eNB may communicate with the UE using the selected radio bearers. According to aspects, the first RAT may be LTE and the second RAT may be WLAN.

Optionally, at 1008, the eNB may schedule a UE capable of communicating data of a same bearer on the first and second RATs simultaneously independently from a UE not capable of communicating data of a same bearer on the first and second RATs simultaneously, where the scheduling is performed using separate schedulers and flow control modules for each type of UE. Optionally, at 1010, the eNB may dynamically determine a priority for the separate schedulers.

According to an aspect, as described in FIG. 8, the eNB may schedule a UE capable of communicating data of a same bearer on the first and second RATs simultaneously (e.g., UE capable of RLC aggregation and/or PDCP aggregation) independently from a UE not capable of communicating data of a same bearer on the first and second RAT simultaneously (e.g., bearer-selection only). Both types of UEs may use separate schedulers and flow control modules.

The scheduler at the eNB for UEs capable of RLC aggregation may use a QoS based scheduling algorithm whereas the scheduler at the eNB for bearer-selection only UEs may use a non-QoS based scheduling algorithm. As illustrated in FIG. 8, the scheduler for UEs capable of communicating data of the same bearer on the first and second RATs simultaneously may implement a proportional fair scheduler and the scheduler for a UE not capable of communicating data of the same bearer on the first and second RATs simultaneously may implement a round-robin based scheduling algorithm. A priority of the schedulers may be dynamically determined.

Figure 11:
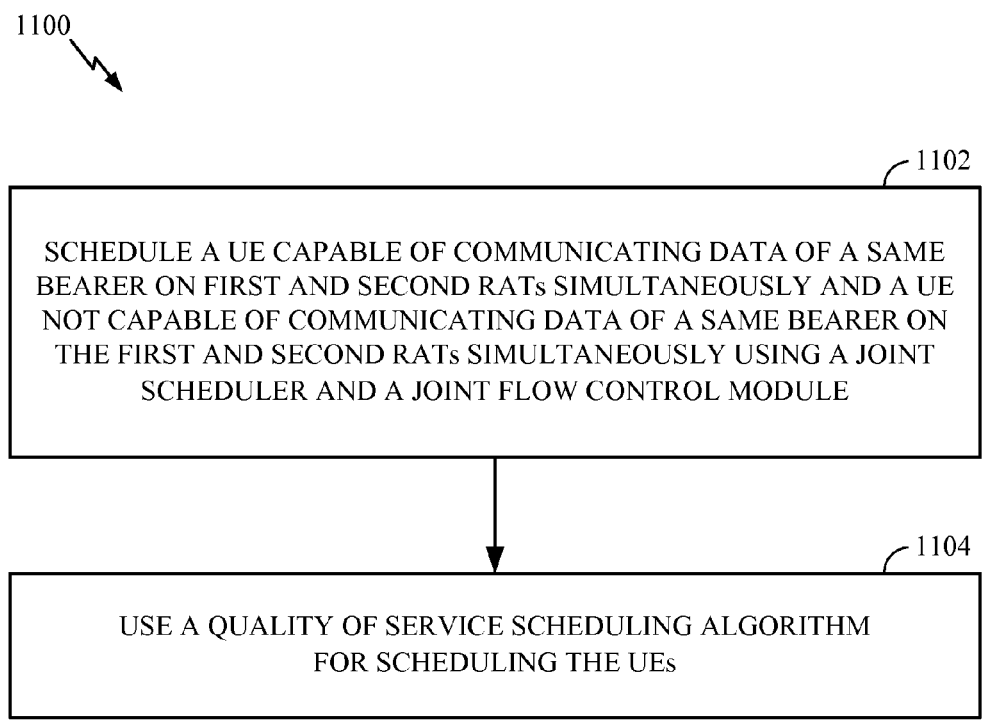
FIG. 11 illustrates operations performed, for example, by an eNB, according to aspects of the present disclosure.

FIG. 11 illustrates example operations 1100 performed, for example, by an eNB for a first RAT according to aspects of the present disclosure. The operations may be performed, for example, by an eNB including one or more components as illustrated in FIG. 3. As described above, antenna 334, Tx/Rx 332, controller/processor 340, scheduler 344, and memory 342 may implement aspects of joint scheduling for UEs capable of communicating data of a same bearer on a first and second RAT simultaneously and UEs not capable of such communication.

At 1102, the eNB may schedule a UE capable of communicating data of a same bearer on the first and second RATs simultaneously and a UE not capable of communicating data of a same bearer on the first and second RATs simultaneously using a joint scheduler and a joint flow control module. At 1104, the eNodeB may use a quality of service scheduling algorithm for scheduling both types of UEs.

According to an aspect, as described in FIG. 9, the eNB may schedule a UE capable of communicating data of a same bearer on the first and second RATs simultaneously (e.g., UE capable of RLC aggregation and/or PDCP aggregation) and a UE not capable of communicating data of a same bearer on the first and second RAT simultaneously (e.g., bearer-selection only) using a joint scheduler and a joint flow control module. The joint scheduler may use a QoS based scheduling algorithm. As illustrated in FIG. 9, the joint scheduler may be a multi-link joint scheduler capable of scheduling LTE-only bearers, RLC-aggregated data, and WLAN-only bearers, wherein RLC-aggregated data is data of the same bearer which may be scheduled on the first and second RATs simultaneously.

Thus, aspects of the present disclosure provide methods and apparatus for an eNB to support UEs capable of and not capable of communicating data of a same bearer on first and second RATs simultaneously. As described with reference to FIGS. 8-11, an eNB of a first RAT may utilize a bearer selection algorithm in an effort to jointly support RLC-aggregation capable UEs and bearer-selection only capable UEs.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a mobile station and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a mobile station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication by an evolved Node B (eNB) of a first radio access technology (RAT), comprising:
   configuring radio bearers of different types for communication with a user equipment (UE) capable of communicating via the first RAT and a second RAT;
   selecting one or more of the radio bearers for routing packets to the UE via at least one of the first or second RAT, wherein the selecting is based at least in part on whether the UE is capable of communicating data of a same bearer on the first and second RATs simultaneously, wherein the selecting comprises scheduling a UE capable of communicating data of a same bearer on the first and second RATs simultaneously independently from a UE not capable of communicating data of a same bearer on the first and second RATs simultaneously, and wherein the scheduling is performed using separate schedulers and flow control modules for each type of UE; and
   communicating with the UE using the selected radio bearers.

2. The method of claim 1, wherein the scheduler for the UE capable of communicating data of a same bearer on the first and second RATs simultaneously employs a quality of service (QoS) based scheduling algorithm and the scheduler for the UE not capable of communicating data of a same bearer on the first and second RATs simultaneously employs a non-QoS based scheduling algorithm.

3. The method of claim 1, further comprising:
   dynamically determining a priority for the separate schedulers.

4. The method of claim 2, wherein the scheduler for the UE capable of communicating data of the same bearer on the first and second RATs simultaneously is a proportional fair scheduler and the scheduler for the UE not capable of communicating data of the same bearer on the first and second RATs simultaneously employs a round-robin based scheduling algorithm.

5. The method of claim 2, wherein the first RAT is Long Term Evolution (LTE) and the second RAT is a Wireless Local Area Network (WLAN).

6. An apparatus for wireless communication by an evolved Node B (eNB) of a first radio access technology (RAT), comprising:
   means for configuring radio bearers of different types for communication with a user equipment (UE) capable of communicating via the first RAT and a second RAT;
   means for selecting one or more of the radio bearers for routing packets to the UE via at least one of the first or second RAT, wherein the means for selecting is based at least in part on whether the UE is capable of communicating data of a same bearer on the first and second RATs simultaneously, wherein the means for selecting further comprises a means for scheduling a UE capable of communicating data of a same bearer on the first and second RATs simultaneously independently from a UE not capable of communicating data of a same bearer on the first and second RATs simultaneously, and wherein the means for scheduling is performed using separate schedulers and flow control modules for each type of UE; and
   means for communicating with the UE using the selected radio bearers.

7. The apparatus of claim 6, wherein the scheduler for the UE capable of communicating data of a same bearer on the first and second RATs simultaneously employs a quality of service (QoS) based scheduling algorithm and the scheduler for the UE not capable of communicating data of a same bearer on the first and second RATs simultaneously employs a non-QoS based scheduling algorithm.

8. The apparatus of claim 6, further comprising:
   means for dynamically determining a priority for the separate schedulers.

9. The apparatus of claim 7, wherein the scheduler for the UE capable of communicating data of the same bearer on the first and second RATs simultaneously is a proportional fair scheduler and the scheduler for the UE not capable of communicating data of the same bearer on the first and second RATs simultaneously employs a round-robin based scheduling algorithm.

10. The apparatus of claim 7, wherein the first RAT is Long Term Evolution (LTE) and the second RAT is a Wireless Local Area Network (WLAN).

11. An apparatus for wireless communication by an evolved Node B (eNB) of a first radio access technology (RAT), comprising:
at least one processor configured to:
configure radio bearers of different types for communication with a user equipment (UE) capable of communicating via the first RAT and a second RAT, and
select one or more of the radio bearers for routing packets to the UE via at least one of the first or second RAT, wherein the selecting is based at least in part on whether the UE is capable of communicating data of a same bearer on the first and second RATs simultaneously, wherein the selecting comprises scheduling a UE capable of communicating data of a same bearer on the first and second RATs simultaneously independently from a UE not capable of communicating data of a same bearer on the first and second RATs simultaneously, and wherein the scheduling is performed using separate schedulers and flow control modules for each type of UE; and
a transmitter configured to communicate with the UE using the selected radio bearers.

12. The apparatus of claim 11, wherein the scheduler for the UE capable of communicating data of a same bearer on the first and second RATs simultaneously employs a quality of service (QoS) based scheduling algorithm and the scheduler for the UE not capable of communicating data of a same bearer on the first and second RATs simultaneously employs a non-QoS based scheduling algorithm.

13. The apparatus of claim 11, wherein the at least one processor is further configured to dynamically determine a priority for the separate schedulers.

14. The apparatus of claim 12, wherein the scheduler for the UE capable of communicating data of the same bearer on the first and second RATs simultaneously is a proportional fair scheduler and the scheduler for the UE not capable of communicating data of the same bearer on the first and second RATs simultaneously employs a round-robin based scheduling algorithm.

15. The apparatus of claim 12, wherein the first RAT is Long Term Evolution (LTE) and the second RAT is a Wireless Local Area Network (WLAN).

16. A non-transitory computer readable medium for wireless communications having instructions stored thereon, the instructions executable by one or more processors for:
configuring, by an evolved Node B (eNB), radio bearers of different types for communication with a user equipment (UE) capable of communicating via a first radio access technology (RAT) and a second RAT;
selecting, by the eNB, one or more of the radio bearers for routing packets to the UE via at least one of the first or second RAT, wherein the selecting is based at least in part on whether the UE is capable of communicating data of a same bearer on the first and second RATs simultaneously, wherein the selecting comprises scheduling a UE capable of communicating data of a same bearer on the first and second RATs simultaneously independently from a UE not capable of communicating data of a same bearer on the first and second RATs simultaneously, and wherein the scheduling is performed using separate schedulers and flow control modules for each type of UE; and
communicating, by the eNB, with the UE using the selected radio bearers.

17. The computer readable medium of claim 16, wherein the scheduler for the UE capable of communicating data of a same bearer on the first and second RATs simultaneously employs a quality of service (QoS) based scheduling algorithm and the scheduler for the UE not capable of communicating data of a same bearer on the first and second RATs simultaneously employs a non-QoS based scheduling algorithm.

18. The computer readable medium of claim 16, wherein the at least one processor is further configured to dynamically determine a priority for the separate schedulers.

19. The computer readable medium of claim 17, wherein the scheduler for the UE capable of communicating data of the same bearer on the first and second RATs simultaneously is a proportional fair scheduler and the scheduler for the UE not capable of communicating data of the same bearer on the first and second RATs simultaneously employs a round-robin based scheduling algorithm.

20. The computer readable medium of claim 17, wherein the first RAT is Long Term Evolution (LTE) and the second RAT is a Wireless Local Area Network (WLAN).

* * * * *